United States Patent
Miller et al.

(10) Patent No.: US 7,450,634 B2
(45) Date of Patent: Nov. 11, 2008

(54) DECISION FEED FORWARD EQUALIZER SYSTEM AND METHOD

(75) Inventors: Timothy R. Miller, Arlington, VA (US); Paul R. Runkle, Durham, NC (US)

(73) Assignee: Freescale Semiconductor, Inc., Austin, TX (US)

( * ) Notice: Subject to any disclaimer, the term of this patent is extended or adjusted under 35 U.S.C. 154(b) by 595 days.

(21) Appl. No.: 10/538,174

(22) PCT Filed: Dec. 9, 2003

(86) PCT No.: PCT/US03/39129

§ 371 (c)(1),
(2), (4) Date: Jun. 9, 2005

(87) PCT Pub. No.: WO2004/054101

PCT Pub. Date: Jun. 24, 2004

(65) Prior Publication Data

US 2006/0164270 A1    Jul. 27, 2006

Related U.S. Application Data

(60) Provisional application No. 60/431,708, filed on Dec. 9, 2002, provisional application No. 60/433,618, filed on Dec. 16, 2002.

(51) Int. Cl.
*H03H 7/30* (2006.01)
*H03H 7/40* (2006.01)
*H03K 5/159* (2006.01)

(52) U.S. Cl. ...................... 375/229; 708/323

(58) Field of Classification Search ......... 375/229–236, 375/350; 333/28 R, 18; 708/322–323, 301
See application file for complete search history.

(56) References Cited

U.S. PATENT DOCUMENTS

| | | | |
|---|---|---|---|
| 4,649,505 A | | 3/1987 | Zinser, Jr. et al. |
| 5,414,733 A | * | 5/1995 | Turner ........................ 375/233 |
| 5,706,057 A | * | 1/1998 | Strolle et al. ............ 375/240.01 |
| 5,835,532 A | * | 11/1998 | Strolle et al. ................. 375/233 |
| 5,850,162 A | | 12/1998 | Danielsons |
| 6,012,161 A | * | 1/2000 | Ariyavisitakul et al. ..... 714/795 |
| 6,118,339 A | | 9/2000 | Gentzler et al. |
| 6,140,874 A | | 10/2000 | French et al. |
| 6,144,255 A | | 11/2000 | Patel et al. |
| 6,147,555 A | | 11/2000 | Posner et al. |
| 6,553,058 B1 | * | 4/2003 | Naito ........................ 375/148 |
| 2003/0115061 A1 | * | 6/2003 | Chen .......................... 704/240 |
| 2007/0064845 A1 | * | 3/2007 | Phanse et al. ............... 375/348 |

* cited by examiner

*Primary Examiner*—Jean B Corrielus

(57) ABSTRACT

An equalizer and corresponding methods is arranged and constructed to mitigate adverse effects of a wireless channel (300). The equalizer includes a delay line (503) coupled to an input signal (501) and comprising a delay circuit coupled to an output combiner (507) that is operable to provide an interim signal (g0 ... gN) and a feed forward circuit (505) coupled to the delay line and operable to provide a feed forward signal (506) that comprises a hard decision scaled according to a scaling factor corresponding to an estimate of channel parameters, wherein the output combiner is operable to combine the feed forward signal and the interim signal to provide an output signal (509) that is compensated for an adverse effect of the wireless channel on the input signal.

23 Claims, 6 Drawing Sheets

DECISION FEED FORWARD EQUALIZER SYSTEM AND METHOD

CROSS REFERENCE TO RELATED APPLICATIONS

This application is a national stage application claiming priority from PCT application PCT/US03/39129, filed on 9 Dec. 2003, which relies for priority on U.S. provisional application No. 60/431,708, filed on 9 Dec. 2002, and on U.S. provisional application No. 60/433,618, filed on 16 Dec. 2002.

FIELD OF THE INVENTION

This invention relates in general to wireless communication systems and more specifically to apparatus for and methods of implementing decision feed forward equalizers in receivers in such systems.

BACKGROUND OF THE INVENTION

Wireless communication devices or units such as receivers and transceivers supporting high and ultra high bandwidth and data rates in corresponding systems are being developed. As these systems have evolved higher frequency channels with larger bandwidths and more sophisticated encoding and modulation schemes are being employed. For example, IEEE 802.15 working group is developing standards for short range communications that specify channels from 3.1 GHz to 5.15 GHz and from 5.825 GHz to 10.6 GHz and data rates as high as 1.35 Gbps (billion bits per second). These systems with wideband or ultra wideband channels that are often referred to as complex channels, present various problems for practitioners. One problem is intersymbol interference that is normally dominated by multipath effects, e.g. the impact of receiving multiple signals or rays as a result of various combinations of reflections of a transmitted signal before it arrives at the receiver location.

It is known to use Equalizers and corresponding methods to improve or reduce the degree of intersymbol interference. Generally a training period is utilized where a known signal is transmitted. When the receiver recovers the known signal various techniques can be used to compensate or restore the recovered signal to a reasonable approximation of the known signal. The resulting compensation or equalization information or parameters can then be used to compensate subsequently and unknown signals that are received. While various techniques exist for performing equalization they suffer from various problems, such as excessive computational complexity or latency or failure to address the relevant vagaries of a complex channel. These shortcomings can be especially troublesome in cost and battery life constrained receivers with limited processing or computational resources.

Thus a need exists for more elegant and improved equalizers and corresponding methods for use with wideband channels.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

DETAILED DESCRIPTION OF PREFERRED EMBODIMENTS

In overview, the present disclosure concerns communication systems including communication units or devices and receivers and methods and apparatus for enabling and effecting equalization of received information that may advantageously be used in communication receivers, equipment, units or the like. More particularly various inventive concepts and principles embodied as equalizers and corresponding methods thereof for use, for example, in communication receivers, to provide or facilitating compensation or equalization of a received signal to mitigate effects of a wireless channel in an elegant computationally efficient manner are discussed and described. The equalizer and methods thereof may be advantageously provided or implemented, for example, in special purpose hardware in integrated circuit form or using a signal processor such as a digital signal processor executing appropriate software.

The communication units or receivers are typically employed in short range (<100 meters and often 1-10 meters) circumstances such as may be encountered in Local Area Networks (LAN) or Personal Area Networks (PAN) for communication links that may be required to support high data rates, such as encountered for example in transferring video data. These receivers may find use in home entertainment systems or small offices and office equipment, conference rooms and equipment and the like that need or can benefit from short range high data rate wireless communication links. The devices or units that will advantageously benefit for the present invention can be a variety of devices with differing functionality if equipped and configured for wireless network operation and provided such equipment or units includes receivers that are arranged and constructed for operation in accordance with the principles and concepts described and discussed. These receivers may be operating in accordance with one or more IEEE standards, such as IEEE.802.15 and the like standards.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Figure 1:
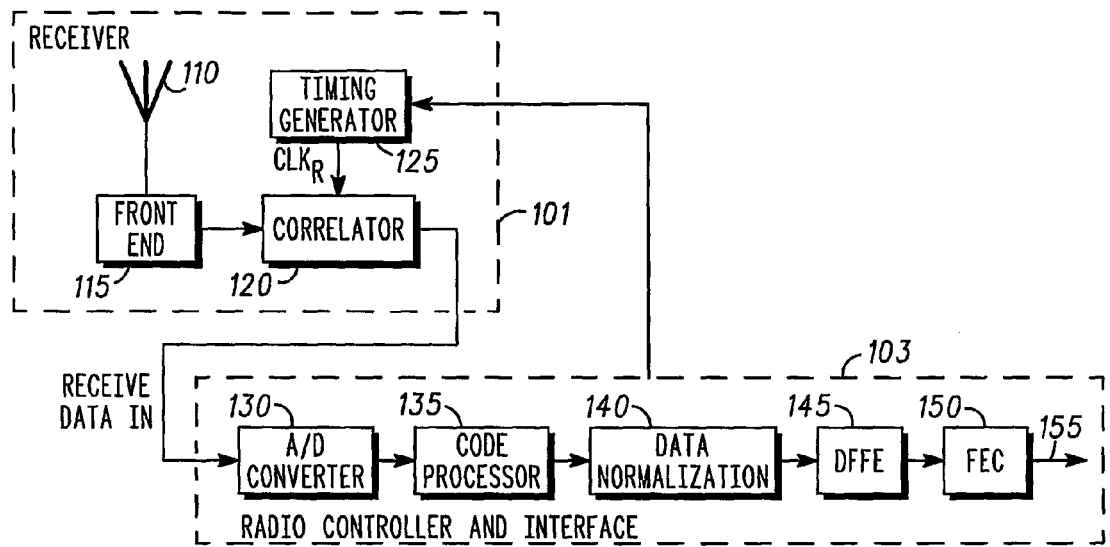
FIG. 1 depicts, in a simplified and representative form a block diagram for a receiver that includes an equalizer.

Much of the inventive functionality and many of the inventive principles are best implemented with or in integrated circuits (ICs) such as application specific ICs or digital signal processors and appropriate software programs or instructions. It is expected that one of ordinary skill, notwithstanding possibly significant effort and many design choices motivated by, for example, available time, current technology, and economic considerations, when guided by the concepts and principles disclosed herein will be readily capable of generating such ICs and software instructions and programs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments. Referring to FIG. 1, a simplified and representative block diagram of a receiver including an equalizer will be discussed and described. Many of the functions depicted in FIG. 1 are known and will not be further discussed in detail. Generally shown and included in the receiver of FIG. 1 is a radio receiver 101 that is suitable for receiving wideband or ultra wideband signals and that is coupled to a radio controller and interface 103 that operates or performs as a receiver backend among other functions. The receiver of FIG. 1 is likely utilized as part of a transceiver, e.g. receiver and transmitter (not shown).

The radio receiver 101 comprises among other entities a known antenna 110, a front end 115, a correlator or ultra wideband correlator 120, and a timing generator 125 providing a receive clock $CLK_R$ all inter coupled as depicted. Generally the front end 115 includes known functionality such as low noise amplifiers, filtering such as band pass filtering and the like suitable to condition and provide a representation of a received signal to the correlator 120 in a form (level, impedance, noise figure, and so forth) that can be processed by the correlator.

The correlator 120 correlates the incoming signal with candidate signals generated in accordance with the timing generator clock to determine whether the receiver is synchronized with an incoming or received signal and whether data is contained in the signal. Generally the correlator as driven by a varying phase of the clock generator (controlled by the radio controller and interface 103) operates to correlate an incoming signal over a correlation window varied with the phase in either an acquisition or tracking mode. Once synchronization has occurred the correlator shifts from the acquisition mode to the tracking mode to maintain synchronization.

When synchronized, the output from the correlator will be a signal with reasonable signal to noise and this signal will be supplied to the controller and interface function 103 at the receive data in port. The controller and interface will unit will provide backend processing for this signal and supply a received data at output 155 to other processes, such as a user interface or the like. This signal may be in many forms, such as pulse position modulation, spread spectrum, OFDM, and the like that are not relevant to and beyond the scope of this disclosure. Generally the signal from the radio receiver 101 will initially be converted to a digital signal at an A/D converter 130 that is typically a relatively wideband, e.g. high-speed (100 M sample per second) converter. The output from the A/D converter 130 is provided to a code processor that converts the signal as coded for transmission to soft data indicative of symbols that were used for modulating the original signal at the originating transmitter.

The soft data will include various adverse effects of the channel such as intersymbol interference, added white Gaussian noise and other perturbations and errors. The soft data is applied to a data normalization function 140 where it is scaled in amplitude and bandwidth for further processing by the equalizer (decision feed forward feed back equalizer) 145. The operation of the equalizer 145 will be discussed in detail below. The soft data out of the equalizer 145 as equalized or compensated for intersymbol interference and other channel induced effects, for example, is applied to a forward error corrector 150 where it is decoded to remove further errors due, for example, to white or burst noise or other perturbations to provide output data in hard form at output 155.

The receiver of FIG. 1 will often experience intersymbol interference when operating on a complex channel. Given multipath propagation, the received components from distinct paths may be of sufficient strength and delay that waveforms from several adjacent bits exhibit mutual interference. This phenomenon, known as intersymbol interference (ISI), adversely affects the received symbol error or bit error rate (BER) and can be qualitatively assessed through examination of an eye pattern. For narrowband systems, ISI is usually dominated by the finite system bandwidth, corresponding to a broad impulse response relative to the symbol or bit duration $T_b$. In contrast, multipath effects of the channel generally dominate the character of wideband or ultra wideband (UWB) ISI. For example, in the presence of multipath ISI, the mixer output distribution is no longer Gaussian, but rather is a mixture of Gaussian distributions with means at distinct positions within an eye pattern. The number of bit intervals, n, over which the ISI is significant, dictates the number of mixtures (relatively distinct levels) within the eye pattern. For example, if the ISI is significant over 3 $T_b$, the number of unique ways that the multipath components will combine is $2^3$, corresponding to 8-possible 3-bit combinations. The relative values of these 8 unique linear combinations will determine the levels within the eye pattern of each mixture component.

For a given acquisition phase, e.g. relative location of a receiver and transmitter and other environmental structures and reflecting surfaces, the net effect of the channel may be modeled as an FIR filter with tap weights corresponding to the relative contributions from distinct multipath components, and with tap delays at multiples of $T_b$. The number of required tap weights, N, is a function of the channel complexity (dependent on channel length, etc) and the bit duration. Given a time reference or phase corresponding to the acquisition point, e.g. receiver location, the ISI coefficients may be computed by convolving the UWB transmit pulse autocorrelation with the channel impulse response and sampling the result at intervals of $T_b$ from the acquisition point.

Figure 2:
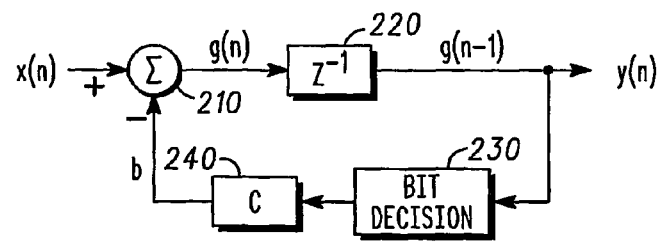
FIG. 2 depicts an exemplary block diagram of a decision feedback equalizer.

Referring to FIG. 2 a simplified decision feedback equalization (DFE) apparatus will be discussed and described. Generally FIG. 2 employs an estimate of the hard bit decisions in the temporal neighborhood of the received soft bit under consideration. The estimated hard bits are subsequently weighted according to the appropriate channel ISI coefficients and combined to form an estimated ISI component that is subtracted from the received soft bit. If the channel coefficients are known exactly, the DFE output will only be corrupted by average white Gaussian Noise (AWGN), which may be compensated for using other techniques, such as forward-error correction (FEC) after the DFE function. More specifically FIG. 2 shows an equalizer using a feedback circuit in which an input signal x(n) is received. The input signal x(n) has a feedback signal b combined, e.g. subtracted from it at a combiner, e.g. summer 210, to form an interim signal g(n), where b is a function of time, n. The interim signal g(n) is delayed by a delay function, such as a delay circuit 220 to form an output signal y(n) or "delayed output signal" that is equal to g(n−1), e.g. the interim signal g at a previous instant in time. The output signal is a delayed output signal because of the presence of the delay circuit 220. In other words, the current output signal y(n) reflects the previous received input signal x(n−1).

The output signal y(n) is fed back through a bit decision circuit 230 and a scaling circuit 240. The bit decision circuit 230 makes a hard or bit decision based on the polarity of the output signal y(n), outputting a value of +1 if the output signal y(n) is positive, and a value of −1 if the output signal y(n) is negative. The scaling circuit 240 scales the bit value by a scaling factor C to create the feedback signal b that has a value of +C or −C. Note that b at time n will thus depend on the polarity of y at time n−1. Thus the output signal at time n can be expressed as:

$$y(n)=g(n-1)=x(n-1)-b(n-1)=x(n-1)-\text{sgn}[y(n-2)]C.$$

This is done to eliminate the effect of reflections on an incoming signal. A reflection of an earlier transmitted symbol or bit of the signal may come in when a current symbol or bit is being received. That earlier bit could interfere with the receiver deciphering the current bit and this is one form of ISI. By subtracting the scaled feedback signal, the receiver can reduce the effect of the reflected earlier bit, making the current bit easier to read or decode or determine. The scaling factor C varies depending upon the strength of the reflection. A stronger reflection requires a higher scaling factor C, since the reflected bit will be higher in power. Likewise a weaker reflection can use a lower scaling factor C, since the reflected bit will be smaller in power. The scaling factor C is preferably scaled, e.g. determined periodically, such as once per frame, although alternate embodiments could scale it more or less frequently. The tradeoff is that a fully adaptive scaling factor C, i.e., one scaled in real time, would be power hungry, e.g. require a large amount of computation resources and thus battery power in mobile devices, and a fixed scaling factor C would not allow the incoming signals to be properly weighted as the channel was changing. The determination of the scaling factor is ordinarily done, for example, during a training phase of the equalizer.

Figure 3:
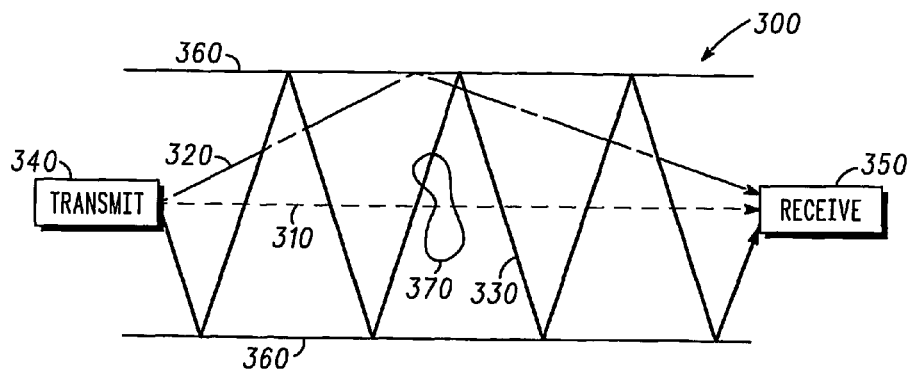
FIG. 3 depicts an exemplary channel between a transmitter and receiver.

However, in many circumstances feedback equalization will not be adequate to provide sufficient compensation. For example, FIG. 3 is a simplified diagram suggesting a channel 300 comprising various signal paths between a transmitter 340 and a receiver 350. In particular, FIG. 3 shows three signal paths. The first signal path 310 goes directly from a transmitter 340 to a receiver 350. The second path 320 experiences a single bounce on a wall 360 or other obstruction before reaching the receiver 350. The third signal 330 experiences several bounces before it reaches the receiver 350. Thus, the first signal 310 will arrive quickest, followed by the second signal 320, followed by the third signal 330.

However, the most direct signal may not necessarily be the strongest signal. For example, if there is some sort of interference 370, such as a wall of other structure that interferes with the first signal 310, it may be attenuated or reduced in power below that of the second signal 320. Furthermore, if there are multiple reflections, they may add together such that all the same-phase reflections of a given bit will be stronger than the direct signal. Thus the quickest or shortest signal path is not always the strongest. In fact symbols or bits transmitted after a desired or target bit can arrive at or before the target bit when the receiver and transmitter are sufficiently removed from each other. Thus, it can be advantageous to subtract not only a previously transmitted bit from the incoming signal (through feedback), but to also subtract a future transmitted bit from the incoming signal (through feed forward). This is possible because the signal is delayed as it is received.

In the event that the acquisition point is sufficiently delayed, e.g. when a reflected multipath component is stronger that a direct path, relative to the onset of the channel impulse response function, bits transmitted after the target bit can contribute to the multipath induced ISI. Since such an acquisition condition is common with a complex channel, DFEs that compensate for this "anti-causal" behavior by, for example, employing feed-forward as well as feedback paths, within the architecture may be required. This approach may be referred to as decision feed-forward/feedback equalizer or equalizing (DFFE). Note that such an equalizer implementation does not violate the laws of physics and time; it simply introduces a system delay equivalent to the expected duration of the anti-causal component. In one embodiment DFFE uses hard decisions that are made on the symbols or bits both prior to and posterior to (before and after) the target or desired symbol or bit, and are linearly combined according to the equivalent channel FIR and subtracted from the target bit.

Figure 4:
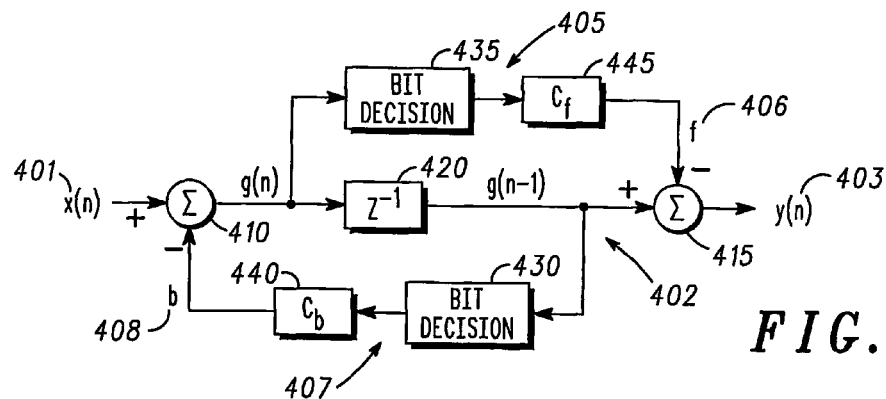
FIG. 4 depicts a block diagram of a Decision Feed Forward equalizer for use in the FIG. 1 receiver.

One specific embodiment using a DFFE is shown in FIG. 4. FIG. 4 shows a feedback/feed forward circuit in which an input signal x(n) 401 is received. The input signal x(n) has a feedback signal b subtracted from it at a first summer 410 to form a signal or an interim signal g(n). The interim signal g(n) is delayed by a delay circuit 420 to form a further interim or delayed interim signal g(n−1). The delayed interim signal g(n−1) has a feed forward signal f subtracted from it at a second summer 415 to form an output signal y(n).

The interim signal g(n) is fed into the feed forward bit decision circuit 435, which makes or provides a hard decision, specifically a bit decision based on or corresponding to the polarity of the interim signal g(n), outputting a value of +1 if the interim signal g(n) is positive, and a value of −1 if the interim signal g(n) is negative. The feed forward scaling circuit 445 then scales the bit value by a scaling factor $C_f$ to create the feed forward signal f that has a value of $+C_f$ or $-C_f$.

The delayed signal g(n−1) is fed into the feedback bit decision circuit 430, which makes a bit decision based on the polarity of the delayed signal g(n−1), outputting a value of +1 if the delayed signal g(n−1) is positive, and a value of −1 if the delayed signal g(n−1) is negative. The feedback scaling circuit 440 then scales the bit value by a scaling factor $C_b$ to create the feedback signal b that has a value of $+C_b$ or $-C_b$.

In particular, the following equations may be used to express the above discussed relationships:

$$g(n)=x(n)-C_b \cdot b(n-1)$$

$$y(n)=g(n-1)-C_f \cdot b(n)$$

$$y(n)=x(n-1)-C_b \cdot b(n-2)-C_f \cdot b(n)$$

$$y(n+1)=x(n)-C_b \cdot b(n-1)-C_f \cdot b(n+1)$$

In addition, while the scaling factors $C_b$ and $C_f$ are shown as being constants, they are preferably updated periodically or from time to time using a training procedure or strategy, to reflect the current transmission environment. As noted earlier the reason for having both feedback and feed forward corrections is that the most direct, i.e., the quickest, signal path is not always the strongest, e.g. later transmitted information can arrive and interfere with reception and decoding of a present desired or targeted bit or symbol.

The equalizer of FIG. 4 is thus arranged and constructed to mitigate adverse effects of a wireless channel. The equalizer includes a delay line 402, coupled to an input signal 401 and comprising a delay circuit 420 coupled to an output combiner 415, where the delay line is operable to provide one or more interim signals g(n−1). Further included is a feed forward function or circuit 405 that is coupled to the delay line 402 at g(n) and operable to provide a feed forward signal 406 that comprises a hard decision scaled according to a scaling factor corresponding to an estimate of channel parameters. The combiner 415 is operable to combine the feed forward signal 406 and the interim signal g(n−1) to provide an output signal 403 that is delayed relative to the input signal and compensated for an adverse effect of the wireless channel on the input signal.

The feed forward circuit or function 405 further comprises a circuit or function 435 that is coupled to the delay line and operable to provide the hard decision, e.g. bit decision, corresponding to a polarity of a signal g(n) at an input to the delay function or circuit 420 and a scaling circuit 445 that is operable to associate the polarity with the scaling factor to provide the feed forward signal 406 (feed forward signal has a value of +/−$c_f$, and the output combiner 415 is a summer that provides a linear combination, e.g. algebraic sum or difference, of the feed forward signal and the interim signal as the output signal.

The FIG. 4 equalizer in other embodiments further comprises a feedback function or circuit 407 that is coupled to the delay line 402 and operable to provide a feedback signal 408 that is scaled according to an other, e.g. feedback, scaling factor $c_b$, corresponding to the estimate of the channel parameters. The delay line further comprises an input combiner 410 that is operable to combine the feedback signal 408 and the input signal 401 to provide a signal g(n) at an input to the delay circuit 420. The feedback circuit 407 further comprises a circuit or function 430 coupled to the delay line and operable to provide an other hard decision corresponding to a polarity of a signal g(n−1) at an output of the delay circuit 420 and an other scaling function or circuit 440 that is operable to associate the polarity with the other scaling factor to provide the feedback signal 408. Various other embodiments of the equalizer and corresponding methods will be discussed and described below.

Figure 5:
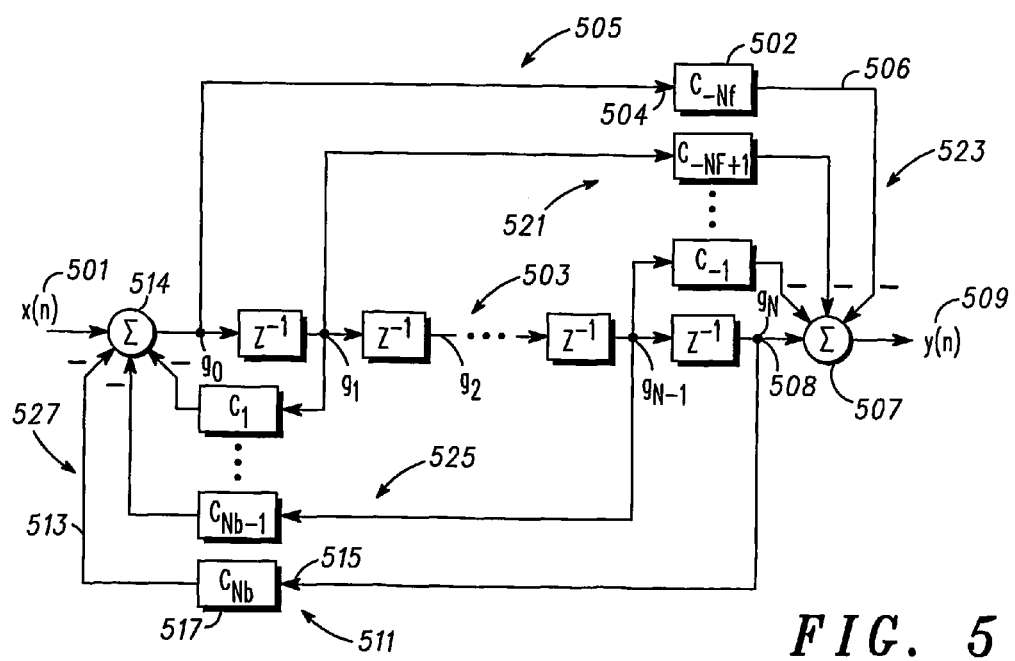
FIG. 5 to FIG. 8 depicts alternative embodiments of a Decision Feedback Feed forward Equalizer.

The block diagram of FIG. 5 depicts a more general architecture for an equalizer implementing corresponding methods that can compensate for such problems. The FIG. 5 architecture for the implementation of a DFFE can be described by the following equations:

$$g_0 = x - \sum_{i=1}^{N_b} \text{sgn}(g_i) c_i$$

$$y = g_{Nf} - \sum_{i=0}^{Nf-1} \text{sgn}(g_i) c_{-Nf+i},$$

where x refers to the input signal x(n) 501, y refers to the output signal y(n) 509, $g_0, \ldots, g_N$ are the signals at the corresponding nodes along the delay line 503, with N=max $(N_f, N_b)$+1, sgn $(g_i)$ refers to the polarity of $g_i$, e.g. less than or greater than 0, $c_i$ refers to a feedback scaling factor and $C_{-Nf+1}$ a feed forward scaling factor that correspond to an estimate of channel parameters. Each coefficient function or box performs a hard bit decision on the soft data in the delay line and scales it with the appropriate channel coefficient. In this illustration, the number of feedback and feed forward coefficients is equal, however alternative embodiments may have different numbers of each with often more feedback functions or coefficients than feed forward.

The FIG. 5 equalizer is an alternative equalizer embodiment practicing corresponding method of equalization that is arranged and constructed to mitigate adverse effects of a wireless channel. The equalizer of FIG. 5 includes a delay line 503, coupled to an input signal 501 and comprising one or more delay circuits with one coupled to an output combiner 507 where the delay line 503 is operable to provide an interim signal gN at node 508. Further included is one or more feed forward functions or circuits that are coupled to the delay line, see feed forward function 505 coupled to the node with signal $g_0$, and operable to provide a feed forward signal 506 that comprises a hard decision scaled according to a scaling factor $c_{-Nf}$ corresponding to an estimate of channel parameters. The output combiner, here a summer, is operable to combine the feed forward signal 506 and the interim signal at node 508 to provide an output signal 509. The output signal 509 is delayed relative to the input signal by the delay line 503 and compensated for one or more adverse effects, e.g. ISI, of the wireless channel on the input signal 501.

The feed forward function or circuit 505 as above can further comprise a circuit or function 504, such as a comparator with a 0 reference, coupled to the delay line 503, that is operable to provide the hard decision, e.g. +/−1, corresponding to a polarity of the signal go at an input to a delay circuit that is part of the delay line 503 and a scaling circuit 502 that is operable to associate or assign the polarity with the scaling factor c-Nf (multiply the two together) to provide the feed forward signal 506 that has a value of +/− the scaling factor or coefficient. The output combiner 507 is a summer that provides a linear combination, e.g. algebraic sum or difference given the polarity assigned to the respective input, of the interim signal $g_N$ and the feed forward signal 506 as the output signal 509.

Further included in certain embodiments of the FIG. 5 equalizer is a feedback circuit function or operation, such as feedback function or circuit 511 that is coupled to the delay line 503 at node 508 and operable to provide a feedback signal 513 that is scaled according to an other or feedback scaling factor $c_{Nb}$ that corresponds also to the estimate of the channel parameters. The delay line 503 further comprises an input combiner 514 that is operable to combine the feedback signal 513 and the input signal 501 to provide a signal $g_0$ at an input to one of the delay circuits of the delay line 503. The feedback function or circuit 511 further comprises a function or circuit 513, e.g. comparator referenced to 0, coupled to the delay line at node 508 and operable to provide an other or feedback hard decision corresponding to a polarity of a signal at an output of a delay circuit that is part of the delay line and an other scaling circuit 517 operable to associate or assign the polarity with the other scaling factor to provide the feedback signal 513.

In further embodiments and as depicted by FIG. 5, the equalizer, specifically the delay line 503 comprises series coupled delay circuits, and the feed forward circuit 505 is one of or further comprises $N_f$ feed forward circuits 521 each coupled to an input of a different any one of the series coupled delay circuits, the $N_f$ feed forward circuits 521 operable to provide $N_f$ feed forward signals 523. The output combiner 507 is further operable to combine the $N_f$ feed forward signals and the interim signal to provide the output signal 509. The feedback function or circuit 511 is one of or further comprises $N_b$ feed back circuits 525 each coupled to an output of a different any one of the series coupled delay circuits, the $N_b$ feedback functions or circuits 525 operable to provide $N_b$ feedback signals 527. The input combiner 514 is further operable to combine the $N_b$ feedback signals 527 and the input signal 501 to provide a signal $g_0$ at a first input of the series coupled delay circuits.

Each of the $N_f$ feed forward circuits 521, as depicted, further comprises a corresponding circuit coupled to the delay line and operable to provide a corresponding hard decision according to a polarity of a signal at the respective input of a respective delay function or circuit and a corresponding scaling circuit operable to associate the polarity with a feed forward scaling factor, e.g. one of $c_{-Nf}$ to $c_{-1}$, to provide a corresponding one of the $N_f$ feed forward signals and the output combiner is a summer that provides a linear combination of the $N_f$ feed forward signals and the interim signal as the output signal.

Each of the $N_b$ feedback functions or circuits 511 as depicted, further comprises a circuit coupled to the delay line and operable to provide an other hard decision corresponding to a polarity of a signal at the output of the corresponding delay function or circuit and an other scaling circuit operable to associate the polarity with the other or feedback scaling factor to provide a corresponding one of the $N_b$ feedback signals. The input combiner is another summer that provides a linear combination of the $N_b$ feedback signals and the input signal, e.g. input signal less the sum of the $N_b$ feedback signals, to provide the signal at the first input of the series coupled delay circuits. Note that the series coupled delay circuits comprises a number of series coupled delay circuits, where the number is equal to or greater than a larger one of $N_f$ and $N_b$, the number of feed forward scaling factors or number of feedback scaling factors, respectively. In some embodiments $N_b$ is equal to or larger than $N_f$. The specific number of feed forward or feedback functions and thus delay elements that need to be employed will depend on various factors including channel characteristics and desired bit or symbol rates on the channel, desired reliability, available processing resources and the like. Normally for channels, especially complex channels, the scaling factors or coefficients or channel parameters are not constant and thus are not known apriori for any extended period of time. Thus the equalizer will have to be trained in order to determine the proper scaling factors.

Therefore, a training period must occur during which the channel coefficients are estimated prior to the operation of the equalizer. Various considerations for training and implementation of the DFFE include one or more of the following many of which will depend on specific circumstances, the above noted factors, and other issues that will be recognized by one of ordinary skill:

The number of feedback ($N_b$) and feed forward ($N_f$) coefficients

The training method: least squares or iterative least squares; blind or supervised The number of training iterations The scale of the soft input data relative to the coefficients Quantization resolution of the soft input data Quantization resolution of the DFFE coefficients Whether the DFFE implementation can meet ASIC timing constraints One approach for training is known as supervised training utilizing a known bit sequence sent over the channel. This approach generally produces more accurate estimates of the channel parameters than when, for example, a blind estimate of the sequence is used. By utilizing a preamble with a linear feedback shift register (LFSR) generated pseudo-random noise (PN) sequence, the receiver may lock onto this sequence and subsequently produce a locally generated training sequence identical to the original transmitted bits as is known. Suppose the binary (+1/−1) or other known symbol pattern is transmitted data in the neighborhood of time k and is represented by:

$b_k = [b_{k-Nf} \ldots b_{k-1} \, b_k \, b_{k+1} \ldots b_{k+Nb}]^T$, where $N_f$ and $N_b$ are the number of feed forward and feedback bits respectively. When this is transmitted through a multipath channel with channel equivalent FIR $c = [c_{-Nf} \ldots c_{-1} \, 1 \, c_1 \ldots c_{Nb}]^T$, the received soft data is $x_k = b_k^T c$. Since the goal of training is to solve for c over a finite period, one alternative is to employ a least-squares (LS) solution based on $K >> (N_f + N_b + 1)$ samples. For the sequence of K training vectors, we have $[x_1 x_2 \ldots x_K]^T = [b_1^T b_2^T \ldots b_K^T]^T c$, or in more compact notation:

$$x = Bc.$$

The closed form solution of $x = Bc$ to obtain the minimum mean squared error channel estimate is given by:

$$c_{LS} = (B^T B)^{-1} B^T x.$$

While the LS solution does provide a good estimate of the channel parameters, it also requires storing the K x ($N_f + N_b + 1$) elements of the matrix B, and performing an inversion of the $(N_f + N_b + 1) \times (N_f + N_b + 1)$ matrix ($B^T B$). Although this matrix is Toeplitz, its inversion still requires $O(N^2)$ operations not including measures to deal with a potentially ill-conditioned system and thus is often not practical in limited resource or cost sensitive receivers.

An attractive sub-optimal alternative to the LS solution is to employ the well-known least mean squares (LMS) algorithm. This efficient and robust approach adapts the estimated channel coefficients in an attempt to minimize the error $e_k$ between the observed soft data and the predicted soft data from the current channel estimate. With the error at the $k^{th}$ iteration given by $e_k = x_k - b_k^T c_k$ and the LMS update for the channel coefficients is $$c_{k+1} = c_k + e_k \mu_k b_k$$

where $\mu$ is a step size factor governing convergence. The latter term is actually a crude estimate of the quadratic error surface gradient in the channel coefficient space. In general, larger values of $\mu$ tend to produce faster convergence to the true coefficients at the expense of large maladjustment errors or noise around the convergence point. In light of this behavior, some embodiments apply $\mu_k = 1/16$, for the first few LMS iterations (k<16) to achieve initial rapid convergence, then subsequently utilize $\mu_k = 1/64$ for the remaining iterations to ensure low convergence noise while maintaining limited continued convergence capability. Note that letting $\mu = 1/2^m$ allows the step size scaling to be performed as a simple m-bit shift rather than a divide.

During both training and normal operation of certain embodiments, the DFFE uses 6-bit soft data out of the baseband digital code processor. The data is scaled through application of AGC followed by a digital AGC stopgap to ensure that the DFFE input is near the optimal level, with the mean-absolute 6-bit level having a value of 16. This is analogous to requiring an 8-bit level of 64 out of the code processor. The full scale of the A/D is not utilized for the mean-absolute levels since there must be sufficient dynamic range to accommodate for ISI and AWGN without excessive clipping. As currently implemented, the LMS algorithm trains the 8-bit channel coefficients for 200 iterations. After training, only the 6-most significant bits of the coefficient values are used to reduce the number of operations and to guarantee real-time operation with, for example, 6-feedback and 3-feedforward coefficients at 100 Mbps.

In one implementation, the 200 training iterations actually occurs over a 400-bit interval to deduce the computational intensity or complexity and enhance an IC's capability to train in real time. Some alternative training implementations that would enable all of the training data to be used even when the channel coefficients themselves are updated at every other bit-interval are available.

This alternative approach or algorithm operates as follows:
The error at time k is:

$$e_k = x_k - b_k^T c_k = x_k - b_k^T(c_{k-1} + \mu e_{k-1} b_{k-1})$$

Observe that the final expression is a function of the channel and the error at time k−1; and the only required values at time k are the training bits $b_k$. Therefore, the channel update for time $c_{k+1}$ remains $$c_{k+1} = c_k + e_k \mu_k b_k$$

with the update implicitly utilizing every available training bit and soft bit, but being performed on every-other sample. Such an implementation allows the vector multiplications to be pipelined and performed at single sample latency, then redirected for the final updates.

Figure 6:
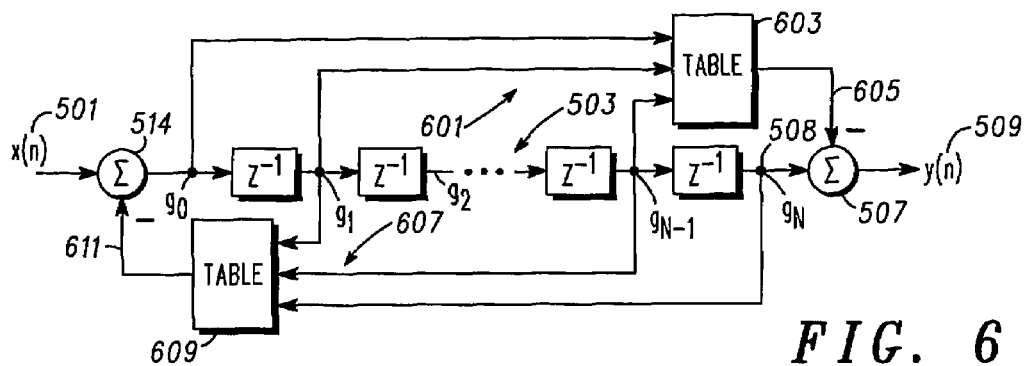

A further consideration concerning the DFFE implementation is to substitute the linear combination of the estimated hard bits as performed, for example, by the feed forward functions 521 or feedback functions 511 with respective lookup tables. This embodiment of an equalizer implementing corresponding methods and using lookup tables is depicted by FIG. 6. The hard bit pattern corresponding to the polarity of the signals at the various nodes along the delay line 503 as determined by the feed forward section or functions or circuits 521 or feedback section or functions or circuits 525 can be used to specify or determine a register address in the respective lookup table, with the contents of that register containing the partial sum or linear combination of the channel coefficients corresponding to the feed forward or feedback portion of the channel response weighted by the hard decision, e.g. bit sign.

Recall that the DFFE feedback correction corresponds to adding or subtracting the feedback scaling factors or channel coefficients from the input signal, e.g. soft bit according to:

$$g_0 = x - \sum_{i=1}^{N_b} \text{sgn}(g_i) c_i$$

The second term, the sum, may therefore only assume $L = 2^{N_b}$ distinct values corresponding to each of the possible combinations of the $N_b$ bits. Rather than performing this sum each time the DFFE output is required, the L possible values may be stored in a lookup table and utilized each time that particular bit pattern is encountered in the DFFE operation. A similar analysis can be conducted and thus similar implementation may be utilized for the feed forward function or section of the DFFE using $2^{N_f}$ lookup registers. While this approach does require pre-calculation of the lookup table values as a final step to training, the implementation itself will be significantly less susceptible to processing pipeline and delay effects in operation as an equalizer.

FIG. 6 shows the input signal 501, delay line 503 comprising input combiner 514, series coupled delay function or circuits, with signals $g_0$–$g_N$ at corresponding nodes, and output combiner 507 coupled to $g_N$ 508 operating together with a feed forward circuit or function(s) 601 and feedback circuit or function(s) 607 similar to the discussions above, to provide output signal 509.

However, the feed forward circuit or function of FIG. 6 advantageously comprises a feed forward look up table 603 that is addressed according to a combination of feed forward hard decisions, each feed forward hard decision corresponding to a polarity of an input signal at a different one of the series coupled delay circuits. The feed forward look up table 603 is operable to provide a unique linear combination of feed forward scaling factors as the feed forward signal 605 for each unique one of the combination of feed forward hard decisions, where the feed forward scaling factors as noted above correspond to the estimate of the feed forward channel parameters. The feed forward signal 605 is combined at combiner 507 to provide the resultant output signal 509.

Furthermore the feedback function or circuit 607 further comprises a feedback lookup table 609 that is addressed according to a combination of feedback hard decisions, each feedback hard decision corresponding to a polarity of an output signal at an other different one of the series coupled delay circuits. The feedback lookup table 609 is operable to provide a unique linear combination of feedback scaling factors as the feedback signal 611 for each unique one of the combination of feedback hard decisions, where the feedback scaling factors as noted above correspond to the estimate of the feedback channel parameters.

The equalizer embodiments discussed above and further below with reference to FIG. 7 and FIG. 8 are advantageously applicable when an input signal corresponds, for example, to a Bipolar Phase Shift Keyed signal although the concepts and principles can be applied more broadly. These embodiments may be especially useful for equalizers and corresponding methods when arranged and constructed for use in a wireless receiver, as, for example, when implemented in an integrated circuit. Note that the equalizer functionality can be embodied in a special purpose or custom integrated circuit or an application specific integrated circuit with high speed CMOS technology being particularly appropriate. Furthermore the depicted and described functionality can be embodied at least in part as a signal processor that is arranged and executing software to perform the various functions. The functionality will likely and advantageously be included together with other functionality required to implement a receiver for an appropriate signal, where the choice between these or other embodiments is largely up to the practitioner in view of various constraints that may apply.

Figure 7:
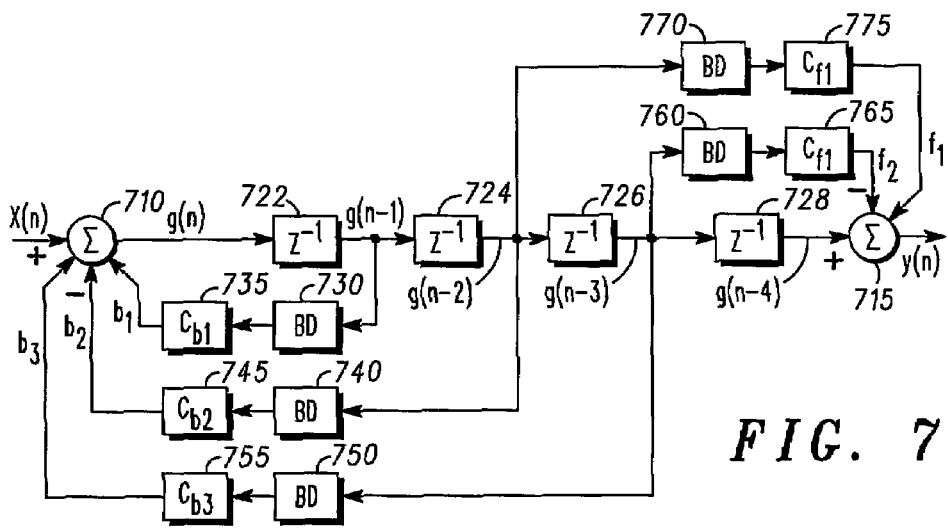

In further alternate embodiments, the number of feed back and feed forward loops or circuits can be further varied. FIG. 7 shows a circuit having two feed forward paths and three feedback paths. In particular, the circuit or apparatus of FIG. 7 includes a first summer 710; first through fourth delays 722, 724, 726, 728; a first feedback path having a first feedback bit decision circuit 730 and a first feedback scaler 735; a second feedback path having a second feedback bit decision circuit 740 and a second feedback scaler 745; a third feedback path having a third feedback bit decision circuit 750 and a third feedback scaler 755; a first feed forward path having a first feed forward bit decision circuit 760 and a first feed forward scaler 765; a second feed forward path having a second feed forward bit decision circuit 770 and a second feed forward scaler 775; and a second summer 715.

The input signal x(n) has first through third feedback signals $b_1$, $b_2$, and $b_3$ subtracted from it at the first summer 710 to form an interim signal g(n). The interim signal g(n) is delayed by first through fourth delay circuits 722-728 to form first through fourth delayed signals g(n−1), g(n−2), g(n−3), and g(n−4). The fourth delayed signal g(n−4) has first and second feed forward signals $f_1$ and $f_2$ subtracted from it at the second summer 715 to form output signal 509, which is delayed relative to the input signal.

The first delayed signal g(n−1) is fed into the first feedback bit decision circuit 730, which makes a bit decision based on the polarity of the first delayed signal g(n−1), outputting a value of +1 if the first delayed signal g(n−1) is positive, and a value of −1 if the first delayed signal g(n−1) is negative. The first feedback scaling circuit 735 then scales the bit value by a scaling factor $C_{b1}$ to create the first feedback signal $b_1$ that has a value of $+C_{b1}$ or $-C_{b1}$.

The second delayed signal g(n−2) is fed into the second feedback bit decision circuit 740, which makes a bit decision based on the polarity of the second delayed signal g(n−2), outputting a value of +1 if the second delayed signal g(n−2) is positive, and a value of −1 if the second delayed signal g(n−2) is negative. The second feedback scaling circuit 745 then scales the bit value by a scaling factor $C_{b2}$ to create the second feedback signal $b_2$ that has a value of $+C_{b2}$ or $-C_{b2}$.

The third delayed signal g(n−3) is fed into the third feedback bit decision circuit 750, which makes a bit decision based on the polarity of the third delayed signal g(n−3), outputting a value of +1 if the third delayed signal g(n−3) is positive, and a value of −1 if the third delayed signal g(n−3) is negative. The third feedback scaling circuit 755 then scales the bit value by a scaling factor $C_{b3}$ to create the third feedback signal $b_3$ that has a value of $+C_{b3}$ or $-C_{b3}$.

The third delayed signal g(n−3) is fed into the first feed forward bit decision circuit 760, which makes a bit decision based on the polarity of the third delayed signal g(n−3), outputting a value of +1 if the third delayed signal g(n−3) is positive, and a value of −1 if the third delayed signal g(n−3) is negative. The first feed forward scaling circuit 765 then scales the bit value by a scaling factor $C_{f1}$ to create the first feed forward signal $f_1$ that has a value of $+C_{f1}$ or $-C_{f1}$.

The second delayed signal g(n−2) is fed into the second feed forward bit decision circuit 770, which makes a bit decision based on the polarity of the second delayed signal g(n−2), outputting a value of +1 if the second delayed signal g(n−2) is positive, and a value of −1 if the second delayed signal g(n−2) is negative. The second feed forward scaling circuit 775 then scales the bit value by a scaling factor $C_{f2}$ to create the second feed forward signal $f_2$ that has a value of $+C_{f2}$ or $-C_{f2}$.

The number of feedback and feed forward paths can be altered as needed, and the two need not be the same. It is typical that the number of feedback loops is greater than the number of feed forward loops. This is because there is a greater likelihood of interference from previous bits than from future bits. As noted above, the scaling factors $C_{b1}$, $C_{b2}$, $C_{b3}$, $C_{f1}$, and $C_{f2}$ are updated periodically, via a training process, e.g., every frame or every other frame.

Figure 8:
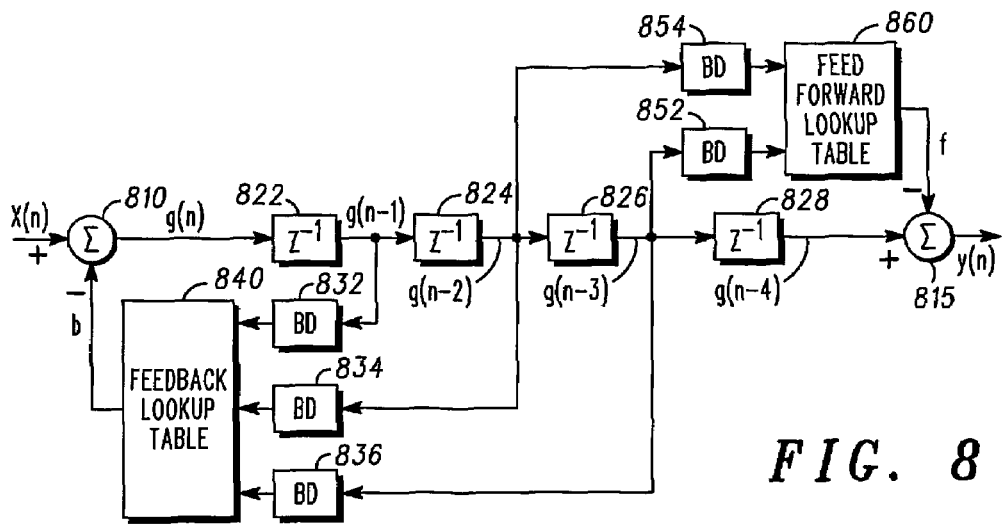

In alternate embodiments the plurality of feed forward scalars can be replaced with a pair of lookup table that are periodically updated. FIG. 8 is a block diagram of a feedback circuit using feed forward and feedback lookup tables. As shown in FIG. 8, the circuit includes a first summer 810; first through fourth delays 822, 824, 826, 828; first through third feedback bit decision circuits 832, 834, 836; a feedback lookup table 840; first and second feed forward bit decision circuits 852, 854; a feed forward lookup table 860; and a second summer 815.

The input signal x(n) has a feedback b subtracted from it at a first summer 510 to form an interim signal g(n). The interim signal g(n) is delayed by first through fourth delay circuits 822-828 to form first through fourth delayed signals g(n−1), g(n−2), g(n−3), and g(n−4). The fourth delayed signal g(n−4) has a feed forward signal f subtracted from it at a second summer 815 to form output signal y(n).

The first delayed signal g(n−1) is fed into the first feedback bit decision circuit 832, which makes a bit decision based on the polarity of the first delayed signal g(n−1), outputting a value of +1 if the first delayed signal g(n−1) is positive, and a value of −1 if the first delayed signal g(n−1) is negative. The second delayed signal g(n−2) is fed into the second feedback bit decision circuit 834, which makes a bit decision based on the polarity of the second delayed signal g(n−2), outputting a value of +1 if the second delayed signal g(n−2) is positive, and a value of −1 if the second delayed signal g(n−2) is negative. The third delayed signal g(n−3) is fed into the third feedback bit decision circuit 836, which makes a bit decision based on the polarity of the third delayed signal g(n−3), outputting a value of +1 if the third delayed signal g(n−3) is positive, and a value of −1 if the third delayed signal g(n−3) is negative.

The third delayed signal g(n−3) is fed into the first feed forward bit decision circuit 852, which makes a bit decision based on the polarity of the third delayed signal g(n−3), outputting a value of +1 if the third delayed signal g(n−3) is positive, and a value of −1 if the third delayed signal g(n−3) is negative. The second delayed signal g(n−2) is fed into the second feed forward bit decision circuit 854, which makes a bit decision based on the polarity of the second delayed signal g(n−2), outputting a value of +1 if the second delayed signal g(n−2) is positive, and a value of −1 if the second delayed signal g(n−2) is negative.

The three bits output by the first through third feedback bit decision circuits 832, 834, 836 are then used as an address of the feedback lookup table 840. In this way, only a single feedback signal b is required, which reflects the sum of the individual feedback portions. Similarly, the two bits output by the first and second feed forward bit decision circuits 852, 854 are then used as an address of the feed forward lookup table 860. Note that the +/−1 in practice may be +1/0 when used an address. In this way, only a single feed forward signal f is required, which reflects the sum of the individual feed forward portions.

Figure 9:
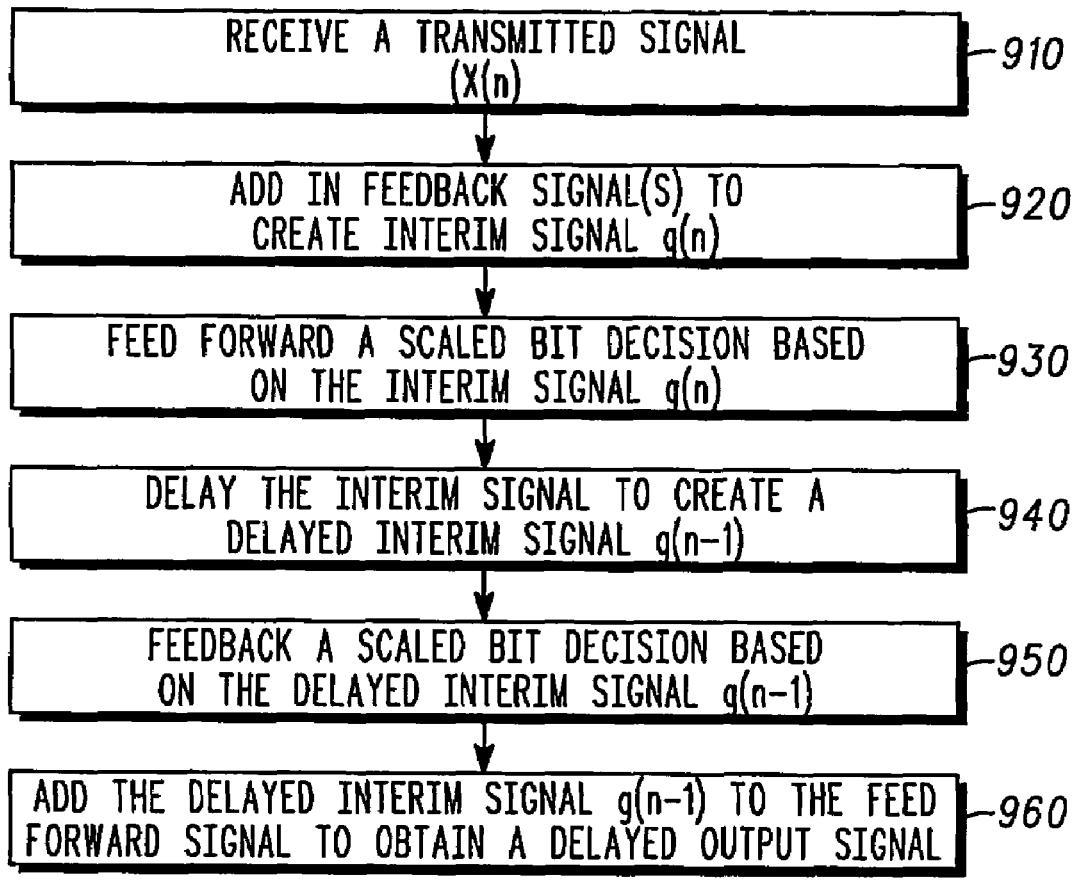
FIG. 9 illustrates a flow chart of a method embodiment for signal equalization.

FIG. 9 is a flowchart showing the general method of using a decision feed forward equalizer with a feed forward path and a feedback path, such as discussed above with reference to one or more of FIG. 4 through FIG. 8. As shown in FIG. 9, the system first receives a transmitted signal x(n) at 910. Then the system adds in feedback signal(s) to create an interim signal g(n) at 920.

The interim signal g(n) is used to determine a feed forward signal, which is a scaled bit decision based on the polarity of the interim signal g(n) multiplied by a feed forward scaling factor at 930. The interim signal g(n) is then delayed to form a delayed interim signal g(n−1) at 640. This delayed interim signal g(n−1) is used to determine the feedback signal, which is a scaled bit decision based on the polarity of the delayed interim signal g(n−1) multiplied by a feedback scaling factor at 950.

Finally, the feed forward signal is subtracted from the delayed interim signal g(n−1) to form an output signal y(n) that is delayed by the delay circuit stage at time n+1 at 960. In general, the output signal can be determined as follows:

$$y(n+R) = x(n) - \sum_{i=1}^{N} C_{bi} \cdot b(n-i) - \sum_{i=1}^{M} C_{fi} \cdot b(n+i)$$

or alternatively:

$$y(n) = x(n-R) - \sum_{i=1}^{N} C_{bi} \cdot b(n-R-i) - \sum_{i=1}^{M} C_{fi} \cdot b(n-R+i)$$

where R is the number of delay registers, N is the number of feedback terms, and M is the number of feed forward terms, $C_{bi}$ is the $i^{th}$ feedback scaling factor counting from the earliest feedback term, $C_{fi}$ is the $i^{th}$ feed forward scaling factor counting from the latest feed forward term, and b(n) is the bit value of g(n). In an efficient implementation, R is typically equal to the maximum of N or M.

More generally the various embodiments shown and discussed above as well as various others can be used to implement a method of equalizing in a receiver or an integrated circuit version of an equalizer or receiver to mitigate adverse effects on a received signal caused by a wireless channel. The method includes delaying a signal corresponding to an input signal with a delay function to provide an interim signal as at 940, providing a feed forward signal that corresponds to the signal and comprises a hard decision scaled according to a feed forward scaling factor that corresponds to an estimate of channel parameters as at 930, and combining the feed forward signal and the interim signal to provide an output signal that is delayed relative to the input signal and compensated for an adverse effect of the wireless channel on the input signal.

The providing the feed forward signal, for example, comprises providing the hard decision or bit decision corresponding to a polarity of a signal at an input to the delay function and associating the polarity with the feed forward scaling factor to provide the feed forward signal as at 930 and the combining further comprises subtracting the feed forward signal from the interim signal to provide the output signal as at 960.

The method in alternative embodiments can further comprise providing a feedback signal that is scaled according to a feedback scaling factor corresponding to the estimate of the channel parameters as at 950 and combining the feedback signal and the input signal to provide the signal corresponding to the input signal at the input to the delay function as at 920. Providing the feedback signal can further comprise providing another hard decision corresponding to a polarity of a signal at an output of the delay function and associating the polarity with the feedback scaling factor to provide the feedback signal.

In further embodiments and more generally, the method discussed and described above may be practiced to equalize or compensate the input signal for ISI due to interference from bits or symbols transmitted earlier (feedback) or from bits or symbols transmitted later (feed forward) given that the processes noted above are further adapted as follows. Note that this method may be advantageously practiced by the structure of FIG. 5 and other structures with similar functionality. The delaying the signal corresponding to the input signal further comprises delaying the signal with series coupled delay functions.

The providing the feed forward signal further comprises providing $N_f$ feed forward signals each dependent on a corresponding hard decision and a corresponding feed forward scaling factor, with the corresponding hard decision reflecting a polarity of a signal at an input of a corresponding one of the series coupled delay functions and the corresponding feed forward scaling factor associated with the polarity. The combining the feed forward signal further comprises combining the $N_f$ feed forward signals and the interim signal to provide the output signal.

The providing the feedback signal further comprises providing $N_b$ feed back signals each dependent on a corresponding other hard decision and a corresponding feedback scaling factor, with the corresponding other hard decision reflecting a polarity of a signal at an output of a corresponding any one of the series coupled delay functions and the corresponding feedback scaling factor associated with the polarity. The combining the feedback signal further comprises combining the $N_b$ feedback signals and the input signal to provide a signal at a first input of the series coupled delay functions.

The methods above can benefit when the series coupled delay functions comprises a number of series coupled delay functions, where the number is equal to or greater than a larger one of $N_f$ and $N_b$. Often the number $N_b$ of feedback scaling factors or channel coefficients that should be considered will be at least equal to and typically larger than the number $N_f$ of feed forward scaling factors.

One of more of the method embodiments noted above can be further adapted as discussed below. This method can be implemented by the structure of FIG. 6 and similar structures and the reader is referred to the discussion of FIG. 6 for further details. Here the providing the feed forward signal further comprises providing a plurality of unique linear combinations of feed forward scaling factors, where the feed forward scaling factors corresponding to the estimate of the channel parameters; and selecting one of the plurality of unique linear combinations of the feed forward scaling factors as the feed forward signal. This selection is based on a combination of feed forward hard decisions, each feed forward hard decision corresponding to a polarity of an input signal at a different one of the series coupled delay functions.

In additional aspects, the providing the feedback signal further comprises providing a plurality of unique linear combinations of feedback scaling factors, with the feedback scaling factors corresponding to the estimate of the channel parameters; selecting one of the plurality of unique linear combinations of feedback scaling factors as the feedback signal based on a combination of feedback hard decisions, where each feedback hard decision corresponds to a polarity of an output signal at a different one of series coupled delay circuits.

The methods and structures discussed above may be especially well suited for input signals that corresponds to or result from a Bipolar Phase Shift Keyed signal or the like. Although various embodiments are shown having particular numbers of feedback or feed forward paths, this should not limit alternate embodiments according to the present invention. The number of feedback and feed forward paths can be varied as required by channel conditions, available processing resources, and the like.

Alternative embodiments of an equalizer using feed forward and feedback are discussed and described below with reference to FIG. 10 and FIG. 11 and these structures and corresponding methods may be especially suited for equalization of M-ary signals. In an M-ary signal, such as M-ary Binary orthogonal keying (M-BOK) signal, multiple bits or data bits are transmitted via a single symbol. For example, if k-bits are to be transmitted via symbol mapping, 1-bit can be used to modulate the polarity of the symbol (+/−) while (k−1) bits are used to select which of the M/2 symbols are transmitted. An example mapping for k=3 and M=8 (8-BOK) is given below.

C1~1 1 1
C2~1 1 −1

C3~1 −1 1
C4~1 −1 −1
−4~−1 1 1
−C~−1 1 −1
−C2~−1 −1 1
−C1~−1 −1 −1 where C1 and negative C1 are the same symbol with a 180 degree phase difference and so forth for the other symbols C2 . . . C4.

From above, the objective of the BPSK DFFE was to correct ISI based on the hard decisions of previous and "future" data bits (the latter being the feed-forward component). This hard decision was accomplished using or based on the polarity or the sign of soft data tapped off of the delay line (see FIG. 5 and FIG. 6 among others). The scaling factors, corresponding to channel coefficients, arithmetically weight each of these hard decisions based on how much they contribute to the ISI of the current soft data as input to the equalizer for feedback adjustments or as output from the equalizer for feed forward adjustments to the soft data.

Figure 10:
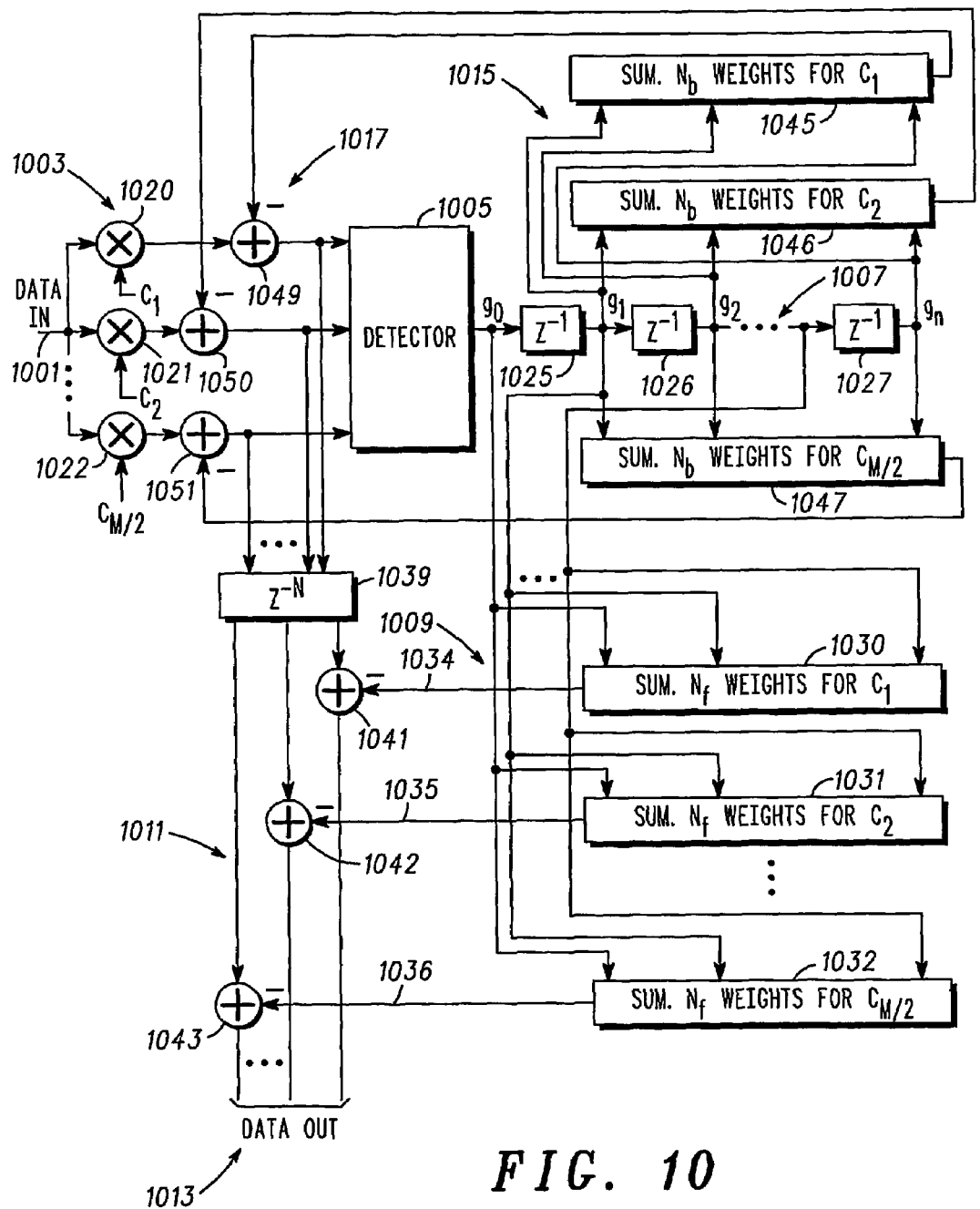
FIG. 10 and FIG. 11 illustrate exemplary block diagrams of a DFFE equalizer suited for equalization of an M-ary signal.
Figure 11:
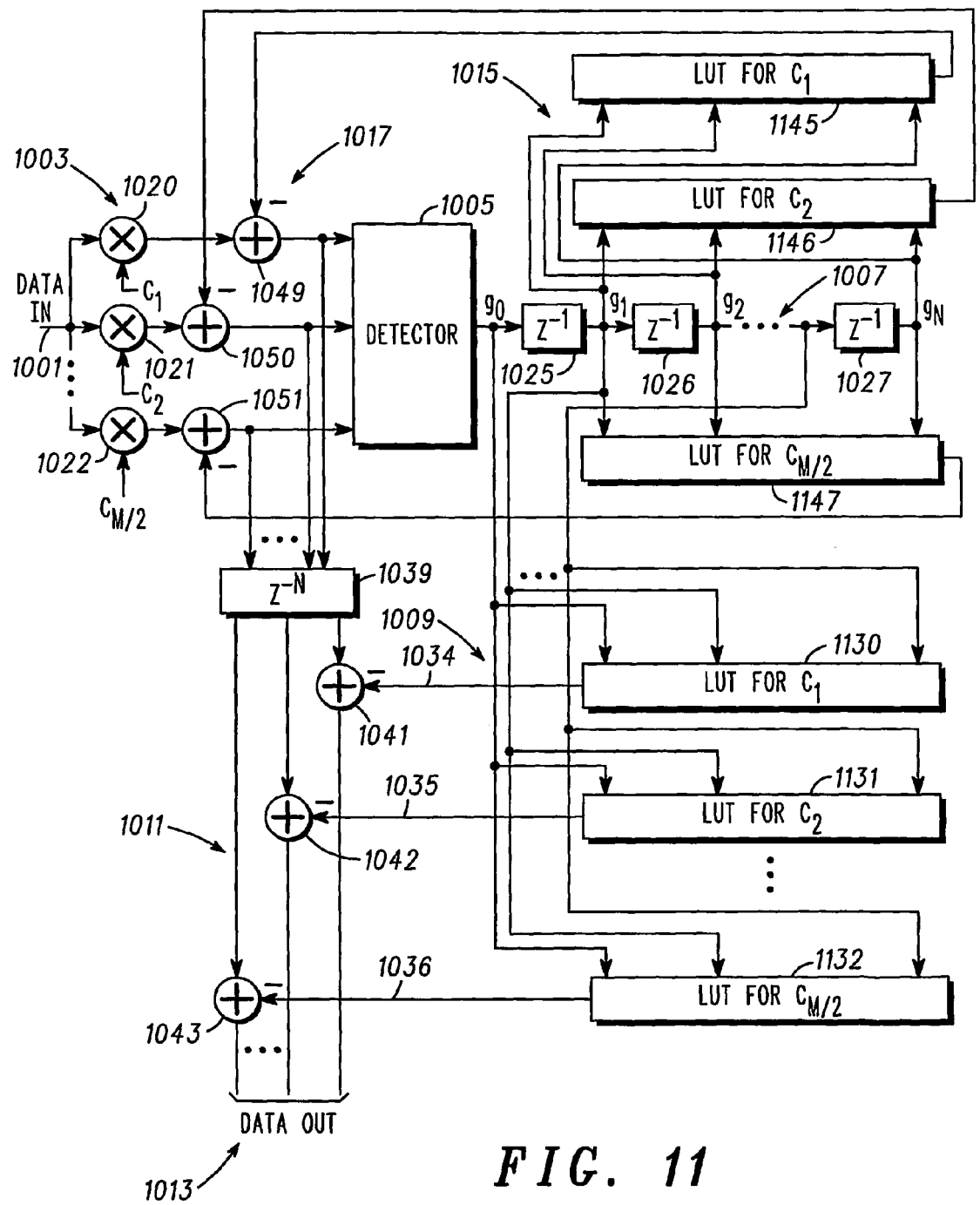

Turning our attention to the equalizers of FIG. 10 and FIG. 11 the detector performs a "hard" decision at each symbol interval by selecting the code symbol (1, . . . M/2) that produces the greatest magnitude out of the input correlators. Using the selected symbol or code and its polarity as provided by the correlators, the detector provides a "hard" mapping to data bits and this hard decision is fed into the tapped delay line at the output of the detector. The system also provides a soft output "DATA OUT" for each of the symbol correlators that is used for soft decision FEC decoding.

Without loss of generality, suppose that the current received symbol is in fact c1. The ISI impacting the correlator output will be a function of what previous (and "future" for the feed-forward element) symbols were sent. This ISI component is computed in the system element labeled "Sum $N_b$ weights for C1". The inputs to this system element are the previous Nb hard decisions, which each select one of (M/2) weights corresponding to channel parameters as estimated in a training procedure to be added (or subtracted depending on the hard decision polarity) to form the intermediate result that may be called ISI(1). This value or feedback signal is fed back and subtracted from the c1 correlator output. This describes how ISI is computed for c1 based on previous hard decisions. To complete the M-ary BOK equalization, we need to compute ISI(1), . . . , ISI(M/2) and subtract these results from their respective correlator outputs. An alternative embodiment uses look-up tables (in place of the "Sum N weights to address pre-computed values of ISI(1), . . . ISI(M/2) based on the previous hard decisions.

Referring to FIG. 10, an equalizer that is arranged and constructed to mitigate adverse effects of a wireless channel on an M-ary signal will be discussed and described. The equalizer comprises an input section 1003 that is coupled to an input signal 1001. The input signal corresponds to the M-ary signal, such as an MBOK signal. The input section is operable to provide a plurality of signals corresponding to a plurality of symbols, e.g. $C_1 \ldots C_{M/2}$ for the MBOK signal or $C_M$ in the more general M-ary case where M is the number of unique symbols in the symbol space as discussed above.

Further included is a detector 1005 that is coupled to the plurality of signals and is operable to or for providing a hard decision indicative of one of the plurality of symbols. The detector determines which of the plurality of signals has the largest magnitude and outputs a hard decision, for example, a corresponding bit pattern for the symbol corresponding to the largest signal magnitude along with the polarity for MBOK symbol spaces. Thus for each time n, the detector will provide a corresponding hard decision indicative of the likely symbol as reflected by the largest signal magnitude.

Additionally included is a delay line 1007 further comprising a delay circuit or series connected delay circuits in some embodiments. The delay circuit or function is coupled to the hard decision(s) and operable to provide one or more delay line hard decisions, $g_1 \ldots g_N$ or a plurality of delay line hard decisions.

Further included is a feed forward section 1009 that is coupled to the delay line and operable to provide a plurality of feed forward signals, each comprising a feed forward scaling factor corresponding to one or more of the delay line hard decision. The feed forward scaling factor corresponds to an estimate of channel parameters and the plurality of feed forward signals corresponds one to one with the plurality of signals.

One last element that is included is an output section 1011 with a plurality of combiners, each operable to a combine a corresponding one of the plurality of signals and a corresponding one of the plurality of feed forward signals to provide an output signal 1013 that is delayed relative to the input signal and compensated for an adverse effect of the wireless channel, such as ISI, on the input signal.

In further embodiments the input section 1003 comprises a plurality of correlators 1020-1022 or M/2 correlators, each operable to correlate the input signal with one of the plurality of symbols, $C_1, C_2, \ldots C_{M/2}$, and provide one of a plurality of correlator signals at the respective correlator outputs, where each of the correlator signals corresponds to one of the plurality of signals. The delay line 1007 further comprises N series coupled delay circuits 1025-1027; each successively delaying the hard decisions from the detector to provide up to $g_N$ delay line hard decisions corresponding to successively delayed hard decisions.

The feed forward section 1009 further comprises a plurality of feed forward scaling functions 1030-1032, each operable to select a first feed forward scaling factor corresponding to a first delay line hard decision and a second feed forward scaling factor corresponding to a second delay line hard decision, and possibly more feed forward scaling factors corresponding to additional delay line hard decisions, where these feed forward scaling factors are associated with a corresponding one of the plurality of symbols. The feed forward scaling functions are also operable to combine the first and second feed forward scaling factors and others when selected to provide a corresponding one of the plurality of feed forward signals 1034-1036. For example, the scaling function 1030 corresponds to the symbol $C_1$, 1031 to symbol C2, etc. The scaling factors that are selected are dependent on the hard decision, e.g. corresponding symbol, as well as the symbol corresponding to the scaling function. Suppose the delay line hard decision indicates negative $C_3$, the scaling function 1031 corresponding to $C_2$ will select a scaling factor, specifically feed forward scaling factor indicative of a channel parameter corresponding to symbol $C_3$ and because of the negative polarity, subtract it from the sum of all other selected scaling factors to provide the corresponding feed forward signal 1035.

Each of the scaling functions will select Nf scaling factors or weights in accordance with corresponding hard decisions from the delay line 1007 and add these weights together to provide the feed forward signal, for example scaling function 1030 provides feed forward signal 1034. Note that FIG. 10 depicts a general case where Nf is equal to N, e.g. the number of series connected delay functions in the delay line. If $N_f$ is less than N which is the typical case, each of the feed forward scaling functions will be connected to the delay line hard decisions at the input of a delay function or element that are the most delayed, e.g. $g_{N-1}, g_{N-2} \ldots g_{N-Nf}$ since these are the nearest in time to the symbol of interest.

In any event other embodiments of the equalizer include the output section 1011 that further comprises a delay line 1039 coupled to the plurality of signals and providing the plurality of signals delayed by the same amount N as the delay line 1007 delays the hard decision(s). This allows for aligning the plurality of signals with the corresponding feed forward signals so that a proper adjustment can be made to each of the plurality of signals to compensate for interference due to later transmitted symbols on the symbol of interest. The output data 1013 is thus soft data that has been compensated for such interference.

One further aspect included in many embodiments of the equalizer of FIG. 10 is a feedback section 1015 that is coupled to the delay line and operable to provide a plurality of feedback signals, each comprising a feedback scaling factor corresponding to a second one of the plurality of delay line hard decisions. The feedback scaling factor also corresponds to the estimate of channel parameters and the plurality of feedback signals corresponds to the plurality of signals. The input section 1003 will further comprise a plurality of input combiners 1017 where each of the plurality of input combiners 1049-1051 is operable to combine a corresponding one of a plurality of correlator signals and a corresponding one of the feedback signals to provide a corresponding one of the plurality of signals to, for example, both the detector 1005 and the delay line 1039.

The feedback section 1015 further comprises a plurality of feedback functions 1045-1047, each operable to select a first feedback scaling factor corresponding to a first one of the plurality of delay line hard decisions and a second feedback scaling factor corresponding to a second one of the plurality of delay line hard decisions, the first and the second feedback scaling factors associated with a corresponding one of the plurality of symbols and each further operable to combine the first and second feedback scaling factors to provide a corresponding one of the plurality of feedback signals. Note that the feedback scaling factors differ from the feed forward scaling factors and depend on the symbol corresponding to the hard decision, the symbol for which a feedback signal is being developed, and the location within the delay line. The scaling functions operate on the relevant scaling factors in accordance with the discussions above regarding the feed forward scaling functions.

Note that N, the number of series connected delay functions or circuits in the delay line 1007 will be the larger of Nb or Nf, respectively, the number of delay line hard decisions and thus scaling factors for the feedback and feed forward equalization or compensation. Note also that the number of series connected delay functions in the delay line 1007 will be equal to the number of such delays or delay functions in the delay line 1039.

Referring to FIG. 11, another embodiment of an equalizer will be discussed and described. Note that like reference numerals refer to like elements from FIG. 10 with the sole distinction between the FIG. 10 embodiment and the FIG. 11 embodiment limited to the actualization or implementation of feed forward and feed back sections. In FIG. 11 the feedback section further comprises a plurality of feedback look up tables, LUTs 1145-1147, each LUT operable to select a linear combination of feedback scaling factors corresponding to the plurality of the delay line hard decisions, the linear combination of feedback scaling factors associated with a corresponding one of the plurality of symbols and each further operable to provide the linear combination of feedback scaling factors as a corresponding one of the plurality of feedback signals. Essentially all possible algebraic combinations of both polarities of the respective scaling factors are pre-calculated and stored in the respective LUT and the combination of delay line hard decisions is used as an address or index to the table and thus the corresponding combination of the respective scaling factors. This implementation saves calculation resources while using the equalizer in exchange for additional calculations during a training process.

Similarly the feed forward section 1009 further comprises a plurality of feed forward look up tables, LUTs 1130-1132, each operable to select a linear combination of feed forward scaling factors corresponding to the plurality of delay line hard decisions, the linear combination of feed forward scaling factors associated with a corresponding one of the plurality of symbols and each further operable to provide the linear combination of feed forward scaling factors as a corresponding one of the plurality of feed forward signals. The linear combination of feed forward scaling factors is pre-calculated and stored within the LUTs and then accessed based on an address corresponding to the delay line hard decisions similar to the above discussion of the feedback section. As noted the equalizer of FIG. 10 or FIG. 11 may be especially suited for processing an input signal, such as an M-ary signal or an M-ary Binary orthogonal keying signal. Furthermore the methods of equalizing disclosed in the discussion of the specific structures of FIG. 10 and FIG. 11 can be implemented in alternative structures having similar functionality.

The performance of the DFFE has been examined using simulated BPSK data under several simulated propagation conditions using a modified Naftali channel model. The model assumes some acquisition point within the channel response, and describes the ISI in intervals of $T_b$. The model employs both causal and anticausal exponentially decaying envelopes with a random weighting to yield the channel equivalent FIR filter:

$$c_k = \alpha_k e^{-\frac{kT_b}{\tau_b}}, k \geq 0$$
$$= \alpha_k e^{-\frac{kT_b}{\tau_f}}, k < 0$$

where $\tau_b$ and $\tau_f$ are the time constants for the causal and anticausal envelopes and $\alpha_k$ is a zero mean, unit variance Gaussian random variable. The time constants for moderate, severe, and very severe ISI may be characterized by $\tau_b=\{5, 10, 20\}$, and $\tau_f=\{2, 7, 10\}$. The $(\tau_b, \tau_f)$ pair (20,10) generally exhibits more ISI than is observed in our 10 m channel measurements through two walls, while the (5,2) pair exhibits similar ISI to a 2 m line-of-sight channel.

The following table characterizes DFFE performance after training for 200 iterations on 6-bit soft data using 8-bit coefficients for training and 6-bit coefficients for implementation after training. The first column characterizes the $\tau_b, \tau_f$ pair; the second column characterizes the degree of AWGN added to the ISI data; the third and fourth columns indicate the mean/standard deviation of the SNR across 20 independent trials each with distinct channels using the parameters from column 1. The last two columns show results when the AGC missed the optimal input level to the DFFE by +/−3 dB. Note that in the presence of significant noise and low ISI, the DFFE slightly degrades the SNR as would be expected since the coefficient training will be dominated by the noise.

| 6-Bits Train Test Channel | log10 BER | SNR IN | SNR Out | SNR −3 dB | SNR +3 dB |
| --- | --- | --- | --- | --- | --- |
| Delta | −3 | 9.9/0.2 | 9.4/0.3 | 8.6/0.5 | 10.0/0.3 |
| Delta | −5 | 12.6/0.2 | 11.9/0.5 | 12.1/0.4 | 11.8/0.6 |
| 5_2 | −12 | 14.5/2.0 | 16.0/0.2 | 15.7/0.5 | 15.7/0.9 |
| 5_2 | −5 | 11.1/1.7 | 11.9/0.2 | 11.7/0.9 | 12.2/0.3 |
| 5_2 | −3 | 9.5/0.5 | 9.5/0.2 | 9.1/0.4 | 10.0/0.3 |
| 10_5 | −12 | 6.1/3.1 | 16.0/0.6 | 14.9/1.0 | 14.7/2.0 |
| 10_5 | −5 | 9.0/2.0 | 12.1/0.2 | 10.8/0.4 | 12.2/0.6 |
| 10_5 | −3 | 6.0/1.8 | 9.0/0.6 | 8.7 0.8 | 10.2/0.2 |
| 20_10 | −12 | 4.5/1.8 | 13.3/3.9 | 11.2/4.1 | 11.5/2.7 |
| 20_10 | −5 | 4.4/1.4 | 10.7/2.5 | 9.2/1.9 | 8.8/0.3 |

The apparatus, processes, and systems discussed above and the inventive principles thereof can alleviate problems caused by present approaches for equalizing signals that have been transmitted over complex channels as well as offer a novel and advantageous methodology for providing such equalizers and methods thereof for use, for example in a wireless communications receiver or device. Using the above discussed principles of making hard decisions on soft data from a common delay line and selecting appropriate feedback and feed forward scaling factors based on such hard decisions and combining these scaling factors with incoming signals to provide an equalized or compensated output signal in soft data form, in a direct computationally efficient manner exhibiting minimal delay, will facilitate a cost effective, efficient, and practical approach for improving complex channel equalizers and corresponding receivers, thereby increasing system performance and contributing to user satisfaction.

It is expected that one of ordinary skill given the above described principles, concepts and embodiments will be able to implement other alternative procedures and structures that may be communications device or protocol dependent and that will also offer additional quick and efficient procedures for facilitating frequency offset calculations and estimates for a receiver. It is anticipated that the claims below cover many such other procedures and structures.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

The invention claimed is:

1. An equalizer arranged and constructed to mitigate adverse effects of a wireless channel, the equalizer comprising:

a delay line, receiving an input signal and comprising a delay circuit coupled to an output combiner, the delay line operable to provide an interim signal;

a feed forward circuit coupled to the delay line and operable to provide a feed forward signal that comprises a hard decision scaled according to a scaling factor corresponding to an estimate of channel parameters; and a feedback circuit coupled to the delay line and operable to provide a feedback signal that is scaled according to an other sealing factor corresponding to the estimate of the channel parameters and wherein the delay line further comprises an input combiner operable to combine the feedback signal and the input signal to provide a signal at an input to the delay circuit, wherein the output combiner is operable to combine the feed forward signal and the interim signal to provide an output signal that is delayed relative to the input signal and compensated for an adverse effect of the wireless channel on the input signal.

2. The equalizer of claim 1 wherein the feed forward circuit further comprises a circuit coupled to the delay line and operable to provide the hard decision corresponding to a polarity of a signal at an input to the delay circuit and a scaling circuit operable to associate the polarity with the scaling factor to provide the feed forward signal and the output combiner is a summer that provides a linear combination of the feed forward signal and the interim signal as the output signal.

3. The equalizer of claim 1 wherein the feedback circuit further comprises a circuit coupled to the delay line and operable to provide an other hard decision corresponding to a polarity of a signal at an output of the delay circuit and a scaling circuit operable to associate the polarity with the other scaling factor to provide the feedback signal.

4. The equalizer of claim 1 wherein:

the delay line further comprises series coupled delay circuits;

the feed forward circuit further comprises $N_f$ feed forward circuits each coupled to an input of any one of the series coupled delay circuits, the $N_f$ feed forward circuits operable to provide $N_f$ feed forward signals;

the output combiner is further operable to combine the $N_f$ feed forward signals and the interim signal to provide the output signal; the feedback circuit further comprises $N_b$ feed back circuits each coupled to an output of the any one of the series coupled delay circuits, the $N_b$ feedback circuits operable to provide $N_b$ feedback signals; and the input combiner is operable to combine the $N_b$ feedback signals and the input signal to provide a signal at a first input of the series coupled delay circuits.

5. The equalizer of claim 4 wherein each of the $N_f$ feed forward circuits further comprises a corresponding circuit coupled to the delay line and operable to provide a corresponding hard decision according to a polarity of a signal at the input of a corresponding one of the any one of the series coupled delay circuits, and a corresponding scaling circuit operable to associate the polarity with the scaling factor to provide a corresponding one of the $N_f$ feed forward signals and the output combiner is a summer that provides a linear combination of the $N_f$ feed forward signals and the interim signal as the output signal.

6. The equalizer of claim 4 wherein each of the $N_b$ feedback circuits further comprises a circuit coupled to the delay line and operable to provide an other hard decision corresponding to a polarity of a signal at the output of a corresponding one of the any one of the series coupled delay circuits, and a scaling circuit operable to associate the polarity with the other scaling factor to provide a corresponding one of the $N_b$ feedback signals and the input combiner is a summer that provides a linear combination of the $N_b$ feedback signals and the input signal to provide the signal at the first input of the series coupled delay circuits.

7. The equalizer of claim 4 wherein $N_b$ is equal to or larger than $N_f$.

8. The equalizer of claim 1 wherein the delay line further comprises series coupled delay circuits; and the feed forward circuit comprises a feed forward look up table that is addressed according to a combination of feed forward hard decisions, each feed forward hard decision corresponding to a polarity of an input signal at a different one of the series coupled delay circuits, the feed forward look up table operable to provide a unique linear combination of feed forward sealing factors as the feed forward signal for each unique one of the combination of feed forward hard decisions, the feed forward scaling factors corresponding to the estimate of the channel parameters.

9. The equalizer of claim 1 wherein the input signal corresponds to a Bipolar Phase Shift Keyed signal.

10. A method of equalizing in a receiver to mitigate adverse effects on a received signal caused by a wireless channel, the method comprising:

delaying a signal corresponding to an input signal with a delay function to provide an interim signal;

providing a feed forward signal that corresponds to the signal and comprises a hard decision sealed according to a feed forward sealing factor that corresponds to an estimate of channel parameters;

providing a feedback signal that is scaled according to a feedback sealing factor corresponding to the estimate of the channel parameters and combining the feedback signal and the input signal to provide the signal corresponding to the input signal at the input to the delay function; and combining the feed forward signal and the interim signal to provide an output signal that is delayed relative to the input signal and compensated for an adverse effect of the wireless channel on the input signal.

11. The method of claim 10 wherein the providing the feed forward signal further comprises providing the hard decision corresponding to a polarity of a signal at an input to the delay function and associating the polarity with the feed forward sealing factor to provide the feed forward signal and the combining further comprises subtracting the feed forward signal from the interim signal to provide the output signal.

12. The method of claim 10 wherein the providing the feedback signal further comprises providing an other hard decision corresponding to a polarity of a signal at an output of the delay function and associating the polarity with the feedback scaling factor to provide the feedback signal.

13. The method of claim 10 wherein:

the delaying the signal corresponding to the input signal further comprises delaying the signal with series coupled delay functions;

the providing the feed forward signal further comprises providing $N_f$ feed forward signals each dependent on a corresponding hard decision and a corresponding feed forward sealing factor, the corresponding hard decision reflecting a polarity of a signal at an input of any one of the series coupled delay functions, the corresponding feed forward scaling factor associated with the polarity;

the combining the feed forward signal further comprises combining the $N_f$ feed forward signals and the interim signal to provide the output signal; the providing the feedback signal further comprises providing $N_b$ feed back signals each dependent on a corresponding other hard decision and a corresponding feedback scaling factor, the corresponding other hard decision reflecting a polarity of a signal at an output of the any one of the series coupled delay functions and the corresponding feedback scaling factor associated with the polarity; and the combining the feedback signal further comprises combining the $N_b$ feedback signals and the input signal to provide a signal at a first input of the series coupled delay functions.

14. The method of claim 13 wherein the series coupled delay functions comprises a number of series coupled delay functions, where the number is equal to or greater than a larger one of $N_f$ and $N_b$.

15. The method of claim 11 wherein the providing the feed forward signal further comprises: providing a plurality of unique linear combinations of feed forward scaling factors, the feed forward scaling factors corresponding to the estimate of the channel parameters; and selecting one of the plurality of unique linear combinations of the feed forward scaling factors as the feed forward signal based on a combination of feed forward hard decisions, each feed forward hard decision corresponding to a polarity of an input signal at a different one of series coupled delay functions.

16. The method of claim 10 wherein the providing the feedback signal further comprises:

providing a plurality of unique linear combinations of feedback scaling factors, the feedback scaling factors corresponding to the estimate of the channel parameters; and selecting one of the plurality of unique linear combinations of feedback scaling factors as the feedback signal based on a combination of feedback hard decisions, each feedback hard decision corresponding to a polarity of an output signal at a different one of series coupled delay circuits.

17. An equalizer arranged and constructed to mitigate adverse effects of a wireless channel on an M-ary signal, the equalizer comprising:

an input section receiving an input signal corresponding to the M-ary signal and operable to provide a plurality of signals corresponding to a plurality of symbols;

a detector coupled to the plurality of signals for providing a hard decision indicative of one of the plurality of symbols; a delay line comprising a delay circuit coupled to the hard decision and operable to provide a plurality of delay line hard decisions;

a feed forward section coupled to the delay line and operable to provide a plurality of feed forward signals, each comprising a feed forward scaling factor corresponding to a first one of the delay line hard decisions, the feed forward scaling factor corresponding to an estimate of channel parameters, the plurality of feed forward signals corresponding to the plurality of signals; and an output section with a plurality of combiners, each operable to a combine a corresponding one of the plurality of signals and a corresponding one of the plurality of feed forward signals to provide an output signal that is delayed relative to the input signal and compensated for an adverse effect of the wireless channel on the input signal.

18. The equalizer of claim 17 wherein the input section comprises a plurality of correlators, each operable to correlate the input signal with one of the plurality of symbols and provide one of a plurality of correlator signals that corresponds to one of the plurality of signals.

19. The equalizer of claim 17 wherein the feed forward section further comprises a plurality of feed forward scaling functions, each operable to select a first feed forward scaling factor corresponding to a first delay line hard decision and a second feed forward scaling factor corresponding to a second delay line hard decision, the first and second feed forward scaling factors associated with a corresponding one of the plurality of symbols and operable to combine the first and second feed forward scaling factors to provide a corresponding one of the plurality of feed forward signals.

20. The equalizer of claim 17 further comprising a feedback section coupled to the delay line and operable to provide a plurality of feedback signals, each comprising a feedback scaling factor corresponding to a second one of the plurality of delay line hard decisions, the feedback sealing factor corresponding to the estimate of channel parameters, the plurality of feedback signals corresponding to the plurality of signals; and wherein the input section further comprises a plurality of input combiners, each operable to combine a corresponding one of a plurality of correlator signals and a corresponding one of the feedback signals to provide a corresponding one of the plurality of signals.

21. The equalizer of claim 20 wherein the feedback section further comprises a plurality of feedback functions, each operable to select a first feedback scaling factor corresponding to a first one of the plurality of delay line hard decisions and a second feedback scaling factor corresponding to a second one of the plurality of delay line hard decisions, the first and the second feedback scaling factors associated with a corresponding one of the plurality of symbols and each further operable to combine the first and second feedback sealing factors to provide a corresponding one of the plurality of feedback signals.

22. The equalizer of claim 20 wherein the feedback section further comprises a plurality of feedback look up tables, each operable to select a linear combination of feedback scaling factors corresponding to the plurality of the delay line hard decisions, the liner combination of feedback scaling factors associated with a corresponding one of the plurality of symbols and each further operable to provide the linear combination of feedback scaling factors as a corresponding one of the plurality of feedback signals.

23. The equalizer of claim 17 wherein the input signal corresponds to one of an M-ary signal and an M-ary Binary orthogonal keying signal.

* * * * *